Patented Mar. 19, 1929.

1,705,857

UNITED STATES PATENT OFFICE.

RALPH L. EMERY, OF CORAOPOLIS, PENNSYLVANIA, ASSIGNOR TO NEVILLE CHEMICAL COMPANY, OF NEVILLE ISLAND, PENNSYLVANIA, A CORPORATION OF PENNSYLVANIA.

METHOD OF PREPARING COUMARON-INDENE RESINS.

Application filed March 3, 1928. Serial No. 259,004.

No Drawing.

This invention relates to the derivation of a resin from coal tar distillates. Specifically, I have employed it in deriving resin from crude solvent naphtha No. 2.

It is known that the components of these distillates from which resin may by polymerization be derived are coumaron and indene. Polymerization may be effected by adding to the distillate a suitable agent, ordinarily sulphuric acid. Other suitable agents are anhydrous stannic tetrachloride and anhydrous phosporic acid. As the result of polymerization, as the operation hitherto ordinarily has been conducted, a syrupy product has been obtained. This syrupy product contains, in a solution of other oils, the polymerized coumaron and indene and other incidentally formed products of reaction, and these other and incidentally formed products of reaction are undesired and have to be eliminated. Various more or less elaborate, more or less costly, and more or less time-consuming procedures are taken to effect their removal. Even so, removal, accomplished with difficulty, is at best incompletely accomplished.

In this procedure as hitherto carried on, the coal tar distillate with which the operation begins contains either or both coumaron and indene in a measure which amounts to 30 per cent, more or less. I have discovered that by taking a coal tar distillate of which the coumaron content or the indene content or the content of coumaron and indene taken together, amounts to as much as 80 per cent and then polymerizing, the incidentally formed and undesired compounds do not as otherwise is the case, go into solution, but because of the insufficiency of the unpolymerized oil, remain as solids in suspension. My further discovery is that having polymerized, it is possible by proper selection of a diluent to dilute the polymerized material and with it the unpolymerized oil still remaining associated with it, without dissolving the solid material in suspension, and to dilute it to such a degree that such solid material in suspension may be gravitated out. I then may decant the liquid, purify it, and remove from it the resin in substantially pure condition entirely free of the undesired incidentally formed products of reaction, and suitable for commercial uses.

Proceeding as I have indicated, I take crude solvent naphtha No. 2, having a coumaron or indene or coumaron and indene component of at least 80 per cent of the whole, and polymerize it with sulphuric acid. The initial product is a very viscous oil, almost a solid. This heavy and viscous product I dilute with petroleum benzine, and so obtain a liquid from which the undesired substances present in suspension separate themselves by gravity. Having decanted from the precipitate the liquid which contains the polymerized substances, I wash from the liquid all trace of acid with water. I then distill under a high vacuum, and additionally I may remove heavy oils by means of live steam, and so I have left as residue in the still the desired resins, free both of the undesired products of polymerization and free also of the undesired unpolymerized oil with which the resin has up to that point been associated. This residue I draw off and cool and flake, so bringing it into condition for purposes of commerce. The material is used largely in the manufacture of varnishes, lacquers, and for other ends.

I claim as my invention:

1. The method herein described of deriving resin from coal tar distillate which consists in preparing a distillate in which the content of coumaron or of indene or of coumaron and indene amounts to as much as 80% of the whole, polymerizing the prepared distillate with the production of incidental precipitates, diluting the polymerized mass with petroleum benzine in which such precipitates are insoluble, removing such precipitates, and separating the dissolved resin.

2. The method of claim 1, the diluting liquid being petroleum benzine.

3. The method of claim 1, in which the liquid after being freed of the precipitate is washed before the resin is separated from it.

4. The method of claim 1, the ultimate separation of the resin being effected by distillation from it of the solvent oil.

5. The method of claim 1, the ultimate separation of the resin being effected by distillation together with penetration by steam.

In testimony whereof I have hereunto set my hand.

RALPH L. EMERY.